United States Patent
Lidin et al.

(10) Patent No.: US 12,052,295 B2
(45) Date of Patent: Jul. 30, 2024

(54) APPLICATION SERVER NODE, USER EQUIPMENT AND METHODS IN A COMMUNICATIONS NETWORK

(71) Applicant: Telefonaktiebolaget LM Ericsson (publ), Stockholm (SE)

(72) Inventors: Jan Lidin, Huddinge (SE); Håkan Österlund, Ekerö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/009,033

(22) PCT Filed: Jun. 10, 2020

(86) PCT No.: PCT/SE2020/050598
§ 371 (c)(1),
(2) Date: Dec. 8, 2022

(87) PCT Pub. No.: WO2021/251856
PCT Pub. Date: Dec. 16, 2021

(65) Prior Publication Data
US 2023/0275934 A1   Aug. 31, 2023

(51) Int. Cl.
*H04L 65/1063* (2022.01)
*H04L 65/1016* (2022.01)
(Continued)

(52) U.S. Cl.
CPC ...... *H04L 65/1063* (2013.01); *H04L 65/1016* (2013.01); *H04L 65/1073* (2013.01);
(Continued)

(58) Field of Classification Search
CPC ............. H04L 65/1063; H04L 65/1016; H04L 65/1073; H04L 67/55; H04L 67/56; H04L 65/80; H04L 69/40; H04W 60/04
See application file for complete search history.

(56) References Cited

U.S. PATENT DOCUMENTS 7,092,707 B2 * 8/2006 Lau ..................... H04L 41/0631
455/512
8,848,516 B2 * 9/2014 Sahin .................... H04W 36/12
370/410
(Continued)

FOREIGN PATENT DOCUMENTS

WO    2008085010 A1    7/2008
WO    2015044663 A1    4/2015
WO    2015104367 A1    7/2015

OTHER PUBLICATIONS

Author Unknown, "Technical Specification Group Core Network and Terminals; IMS Restoration Procedures (Release 16)," Technical Specification 23.380, Version 16.2.0, Dec. 2019, 3GPP Organizational Partners, 56 pages.
(Continued)

*Primary Examiner* — Abdullahi E Salad
(74) *Attorney, Agent, or Firm* — Withrow & Terranova, PLLC

(57) ABSTRACT

A method performed by an Application Server (AS) node PCRM-AS for assisting a UE in restoring an association between an Internet protocol Multimedia Subsystem, IMS, node, and the UE via one or more first intermediate proxy nodes in a communications network is provided. When the AS node receives from the UE, a first registration relating to the association, monitor said association. The first registration registers the UE to an IMS network. The first registration comprises an identity identifying the UE and a Push Notification Service (PNS) node serving the UE. When any of the intermediate proxy nodes in the monitored association becomes unavailable, the AS node sends an instruction to the identified PNS node. The instruction instructs the PNS node to send a notification to the identified UE. The notification triggers the UE to restore the association between the IMS
(Continued)

node and the UE via one or more available second intermediate proxy nodes.

16 Claims, 11 Drawing Sheets

(51) Int. Cl.
*H04L 65/1073* (2022.01)
*H04L 67/55* (2022.01)
*H04L 67/56* (2022.01)
*H04W 60/04* (2009.01)

(52) U.S. Cl.
CPC .............. *H04L 67/55* (2022.05); *H04L 67/56* (2022.05); *H04W 60/04* (2013.01)

(56) References Cited

U.S. PATENT DOCUMENTS

| | | | |
|---|---|---|---|
| 9,473,912 B2* | 10/2016 | Circosta | H04L 67/303 |
| 11,050,799 B2* | 6/2021 | Zhu | H04W 76/10 |
| 2008/0175157 A1* | 7/2008 | Lim | H04L 65/1073 |
| | | | 370/242 |
| 2014/0341085 A1* | 11/2014 | Suryavanshi | H04L 65/1063 |
| | | | 370/260 |
| 2020/0305211 A1* | 9/2020 | Foti | H04L 65/1073 |
| 2021/0092471 A1* | 3/2021 | Fishman | H04N 21/4753 |
| 2021/0185097 A1* | 6/2021 | Kinsey | H04L 65/1073 |

OTHER PUBLICATIONS

Holmberg, et al. "Push Notification with the Session Initiation Protocol (SIP)," Request for Comments 8599, May 2019, Internet Engineering Task Force, 40 pages.

Thomson, et al., "Generic Event Delivery Using HTTP Push," Request for Comments 8030, Dec. 2016, Internet Engineering Task Force, 31 pages.

International Search Report and Written Opinion for International Patent Application No. PCT/SE2020/050598, mailed Feb. 10, 2021, 10 pages.

* cited by examiner

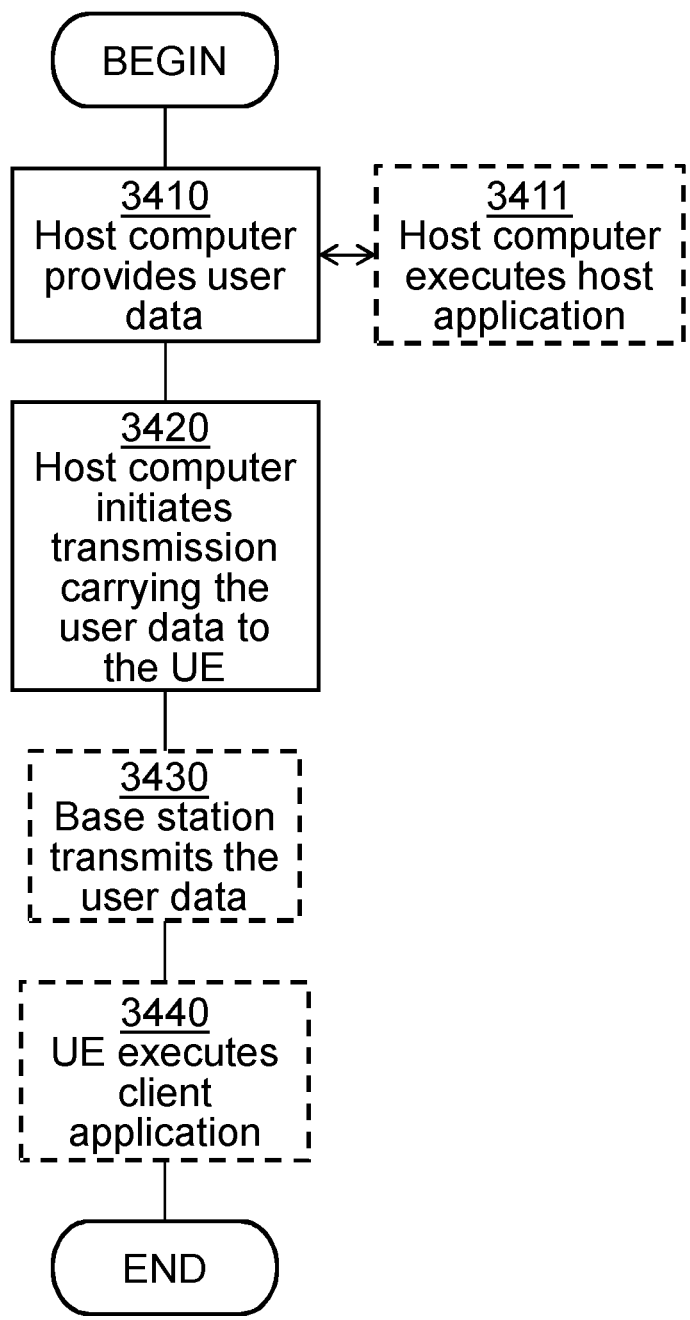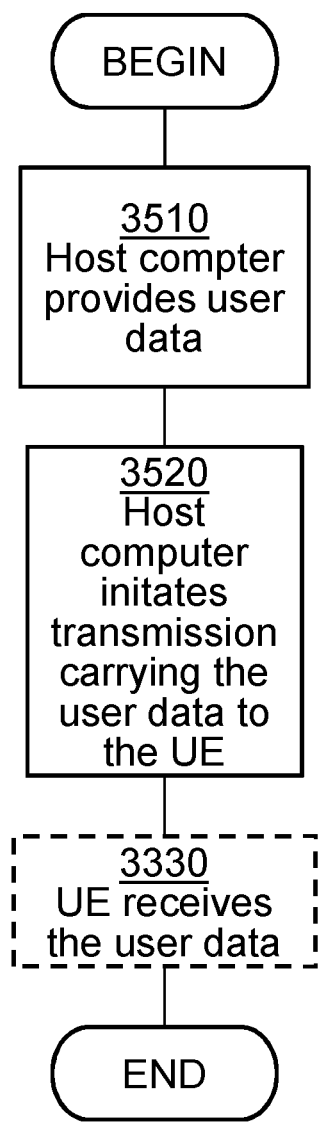
Fig. 9
Fig. 10

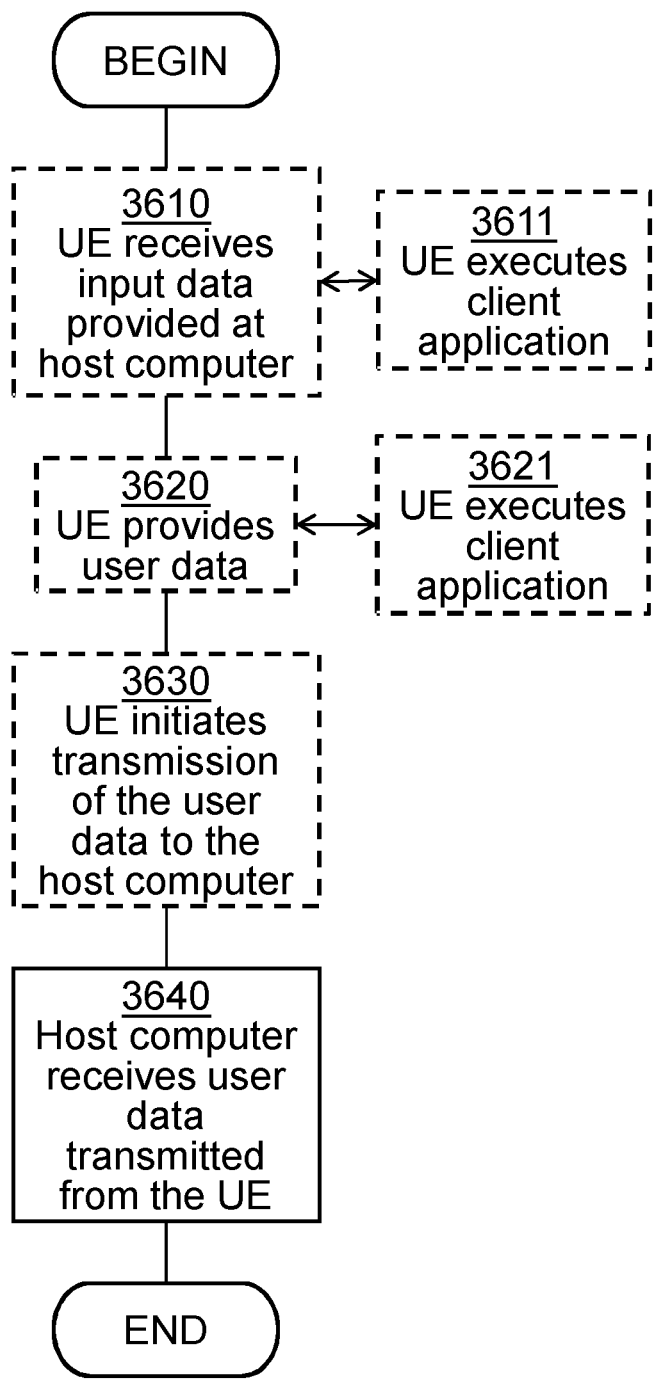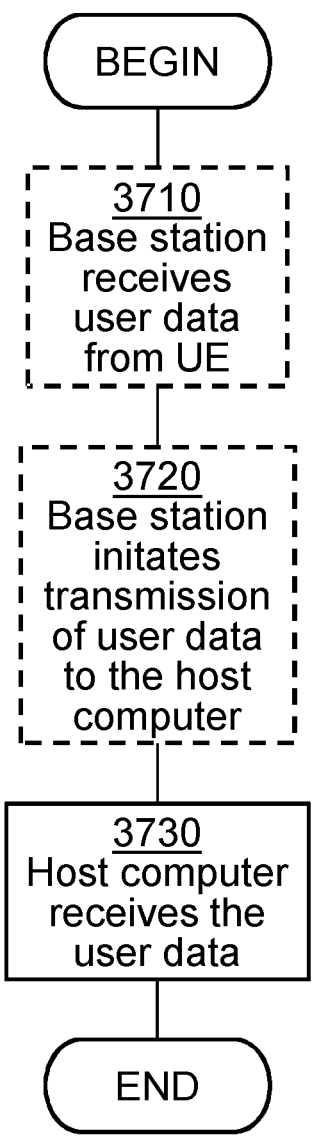
Fig. 11
Fig. 12

APPLICATION SERVER NODE, USER EQUIPMENT AND METHODS IN A COMMUNICATIONS NETWORK

This application is a 35 U.S.C. § 371 national phase filing of International Application No. PCT/SE2020/050598, filed Jun. 10, 2020, the disclosure of which is incorporated herein by reference in its entirety.

TECHNICAL FIELD

Embodiments herein relate to an Application Server (AS) node, a User Equipment (UE) and methods therein. In some aspects, they relate to assisting a UE in restoring an association between an Internet Protocol Multimedia Subsystem (IMS) node and the UE in a communications network.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a 5G network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

The Internet Protocol (IP) Multimedia Subsystem (IMS) is a well-known 3GPP standard allowing sessions to be set up between two or more parties for a broad variety of services such as voice or video call, interactive messaging sessions or third party specific applications. A protocol chosen by 3GPP is the Session Initiation Protocol (SIP). SIP provides a mechanism for the registration of UEs and for setting up multimedia sessions. The SIP REGISTER method enables the registration of user agent's current location and the INVITE method enables the setting up of a session. IMS is being implemented by Public Land Mobile Network (PLMN) operators as an architectural framework for delivering IP multimedia services to their subscribers.

Functional Elements in the IMS Network

An IMS network comprises several network entities, some of which are discussed here.

Proxy Call Session Control Function (P-CSCF)

The P-CSCF is the first point of contact for a UE connected to the IMS network. It may be located in either a home network or a visited network. It behaves a SIP-proxy, i.e. it accepts requests and services them internally or forwards them on and forwards SIP requests or responses to the UE.

Serving Call Session Control Function (S-CSCF)

The S-CSCF is a SIP server and is the central signaling node in the IMS network and performs session control services for the UE. It handles SIP registrations and is responsible for forwarding SIP messages to the correct application server. The S-CSCF may behave as a SIP-proxy, i.e. it accepts requests and services them internally or forwards them on

Home Subscriber Server (HSS)

The HSS is a subscriber database comprising subscriber profiles, performs authentication and authorization, and provides information on service provisioned for subscribers and information on the location and IP address of a subscriber.

Application Server (AS)

An AS, e.g. a SIP AS, Open Service Access (OSA) AS or a Customized Applications for Mobile network Enhanced Logic (CAMEL) IP Multimedia-Service Switching Function (IM-SSF), offers value added IP Multimedia (IM) services and resides e.g. in a UEs home network or in a third party location. The third party may be a network or simply a stand-alone AS.

HSS-Based P-CSCF Restoration

To use IMS services, an application executed in a UE registers to the IMS network, and thereby creates an association with IMS network. One way to a failed association to the IMS network may be restored, is to use the HSS-based P-CSCF restoration procedure according to 3GPP TS 23.380 IMS Restoration procedures. The procedure is specified for IMS 3GPP access, trusted WLAN access and untrusted WLAN access. For WLAN access, the HSS checks, during the restoration procedure, if the UE has a non-3GPP access subscription with an IMS Access Point Name (APN) configuration and if the UE has a non-3GPP access registration in the HSS, for the WLAN access. If this is the case, the HSS-based P-CSCF restoration procedure is performed. Otherwise, the HSS-based P-CSCF restoration procedure is not triggered and an error response is provided to the S-CSCF.

If the HSS-based P-CSCF restoration procedure cannot be used for the UE, e.g. if the UE does not have an IMS APN configuration, the UE may not realize that the association needs to be restored. This may lead to disruptions in services and leave the UE unable to communicate with the IMS network.

SUMMARY

As a part of developing embodiments herein, a problem was identified by the inventors and will first be discussed.

A problem is that the IMS APN may not be available to applications executed in a UE. This is since the applications may be restricted by the UEs operating system on to what extent they can utilize the radio interface on the UE. Instead, these applications have to interact with the IMS network using the general Internet APN. Since the IMS APN is not available to the applications, the HSS-based P-CSCF restoration procedure cannot be used. It must instead rely on performing frequent SIP re-REGISTERs, or other keep-alive signaling, to make sure that the association with the IMS network is still available. This means more signaling and increased power consumption, leading to a decreased performance of the communications network and reduced battery life in the UE.

An object of embodiments herein is to improve the performance of a communications network comprising an IMS network.

According to an aspect of embodiments herein, the object is achieved by a method performed by an Application Server, AS, node for assisting a User Equipment, UE, in restoring an association between an Internet protocol Multimedia Subsystem, IMS, node, and the UE via one or more first intermediate proxy nodes in a communications network. When the AS node receives from the UE, a first registration relating to the association, the AS node monitors said association. The first registration registers the UE to an IMS network. The first registration comprises an identity identifying the UE and a Push Notification Service, PNS, node serving the UE. When any of the intermediate proxy nodes in the monitored association becomes unavailable, the AS node sends an instruction to the identified PNS node. The instruction instructs the PNS node to send a notification to the identified UE. The notification triggers the UE to restore the association between the IMS node and the UE via one or more available second intermediate proxy nodes. The association is restored by sending a second registration relating to the restored association, to re-register the UE to the IMS network.

According to another aspect of embodiments herein, the object is achieved by a method performed by a User Equipment, UE, for restoring an association between an Internet protocol Multimedia Subsystem, IMS, node and the UE via one or more first intermediate proxy nodes in a communications network. The UE sends to an Application Server, AS, node, a first registration relating to the association. The first registration registers the UE to an IMS network. The first registration comprises an identity identifying the UE and a Push Notification Service, PNS, node serving the UE. When any of the intermediate proxy nodes in the association becomes unavailable, the UE receives a notification from the identified PNS node. The notification triggers the UE to restore the association between the IMS node and the UE via one or more available second intermediate proxy nodes. The association is restored by sending a second registration relating to the restored association, to re-register the UE to the IMS network.

According to another aspect of embodiments herein, the object is achieved by an Application Server, AS, node configured to assist a User Equipment, UE, in restoring an association between an Internet protocol Multimedia Subsystem, IMS, node, and the UE via one or more first intermediate proxy nodes in a communications network. The AS node is further configured to:

When receiving from the UE a first registration relating to the association, monitor said association, wherein the first registration is adapted to register the UE to an IMS network, and wherein the first registration further is adapted to comprise an identity adapted to identify the UE and a Push Notification Service, PNS, node serving the UE (120), and when any of the intermediate proxy nodes in the monitored association becomes unavailable, send an instruction to the identified PNS node, which instruction is adapted to instruct the PNS node to send a notification to the identified UE, which notification is adapted to trigger the UE to: restore the association between the IMS node and the UE via one or more available second intermediate proxy nodes by sending a second registration relating to the restored association, to re-register the UE to the IMS network.

According to another aspect of embodiments herein, the object is achieved by a User Equipment, UE. The UE is configured to restore an association between an Internet protocol Multimedia Subsystem, IMS, node and the UE via one or more first intermediate proxy nodes in a communications network. The UE is further configured to:

Send to an Application Server, AS, node, a first registration relating to the association, wherein the first registration is adapted to register the UE to an IMS network, and wherein the first registration further is adapted to comprise an identity adapted to identify the UE and a Push Notification Service, PNS, node serving the UE, and when any of the intermediate proxy nodes in the association becomes unavailable, receive a notification from the identified PNS node, triggering the UE to:

restore the association between the IMS node and the UE via one or more available second intermediate proxy nodes by sending a second registration relating to the restored association, to re-register the UE to the IMS network.

Thanks to that the AS node receives an identity that identifies the UE and the PNS node in the first registration, and that the AS node monitors the association related to the first registration, it is possible for the AS node to notify the UE when one or more of the first intermediate proxy nodes becomes unavailable. This is performed by the AS node instructing the PNS node to send a notification to the UE that triggers the UE to restore the association. In this way, an efficient mechanism improving the restoration of an association between the UE and the IMS node is achieved which results in increased battery life for the UE and an improved performance of the communications network comprising an IMS network.

Embodiments herein brings advantages of achieving high availability with minimal additional signaling IMS for applications without access to the IMS APN, reducing the load in a RAN, EPC, 5GC, IMS, and saving power in the UE.

BRIEF DESCRIPTION OF THE DRAWINGS

Examples of embodiments herein are described in more detail with reference to attached drawings in which:

FIGS. 9 to 12 are flowcharts illustrating methods implemented in a communication system including a host computer, a base station and a user equipment.

DETAILED DESCRIPTION

Embodiments herein relate to a communications network and the restoration of an association between a UE to an IMS network using a Push Notification Service (PNS) based IMS proxy restoration procedure.

Example embodiments herein provides an efficient mechanism improving the restoration of an association between the UE and the IMS network by adding an AS node such as a new IMS AS node, e.g. a P-CSCF Restoration Monitoring AS (PCRM-AS). The AS node according to embodiments herein monitors the status of intermediate proxy nodes such as e.g. P-CSCFs and, when applicable SIP-proxy nodes. The AS node thereby instantly discovers loss of registration in the IMS system in a resource optimized way.

Figure 1A:
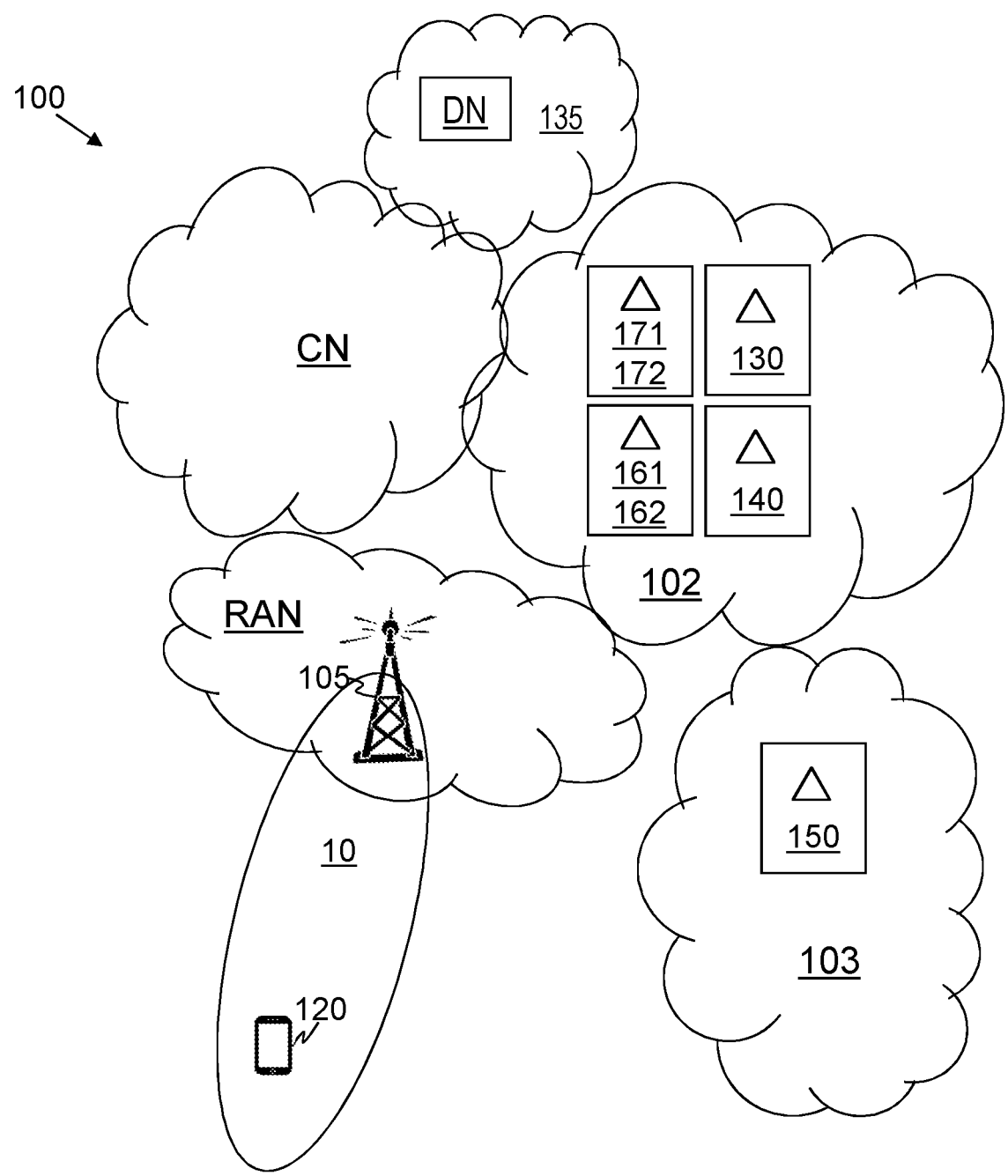
FIG. 1a is a schematic block diagram illustrating embodiments of a communications network.

Further, embodiments herein provides an efficient mechanism improving the restoration of an association between the UE and the IMS network since the AS node notifies the UE, by using a Push Notification Service (PNS) node, when any of the intermediate proxy nodes such as e.g. a P-CSCF or SIP-proxy becomes unavailable, thereby achieving high availability with minimal additional signaling and increasing the battery life of the UE Embodiments herein relate to communication networks in general. FIG. 1a is a schematic overview depicting a communications network 100. The communications network 100 comprises one or more RANs and one or more CNs. The communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing communication systems such as e.g. WCDMA and LTE.

The communications network 100 further comprises an IMS network 102, in which IMS network 102, an AS node 130, an IMS node 140. The IMS network 102 is an architecture for delivering media content over an Internet Protocol (IP) packet switched transport.

The communications network 100 may further communicate with another network 103, e.g. a vendor network.

A number of network nodes operate in the communications network 100 such as e.g. a network node 105. This node provide radio coverage in a number of cells which may also be referred to as a beam or a beam group of beams, such as a cell 10 provided by the network node 105.

The network node 105 may be any of a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 105 depending e.g. on the first radio access technology and terminology used. The network node 105 may be referred to as a serving network node and communicates with a UE 120 with Downlink (DL) transmissions to the UE 120 and Uplink (UL) transmissions from the UE 120.

In the communication network 100, one or more UEs operate, such as e.g. the UE 120. The UE 120 may also referred to as a device, an IoT device, a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The AS node 130 is used for monitoring and assisting in restoring associations between the UE 120 and the IMS node 140. The AS node 130 may e.g. be a P-CSCF Restoration Monitoring Application Server (PCRM-AS).

The IMS node 140 is used for performing session control service for the UE 120 and may e.g. be an S-CSCF.

The PNS node 150 is used for sending notifications, such as e.g. push notification, to the UE 120 on behalf of e.g. the AS node 130. The notification may, but is not limited to, e.g.

trigger the UE 120 perform a re-registration. The PNS node 150 e.g. operates in the network 103.

Intermediate proxy nodes 161, 162, 171, 172 are used for forwarding messages from the UE 120 to the IMS node 140, or from the IMS node 140 to the UE 120. The intermediate proxy nodes 161, 162, 171, 172 may also perform session control services for the UE 120. The intermediate proxy nodes 161, 162, 171, 172 may e.g. be SIP-proxies such as e.g. a P-CSCF or another type of SIP-proxy.

Methods herein may be performed by the AS node 130 and the UE 120. As an alternative, a Distributed Node (DN) and functionality, e.g. comprised in a cloud 135 as shown in FIG. 1a, may be used for performing or partly performing the methods herein.

Figure 1B:
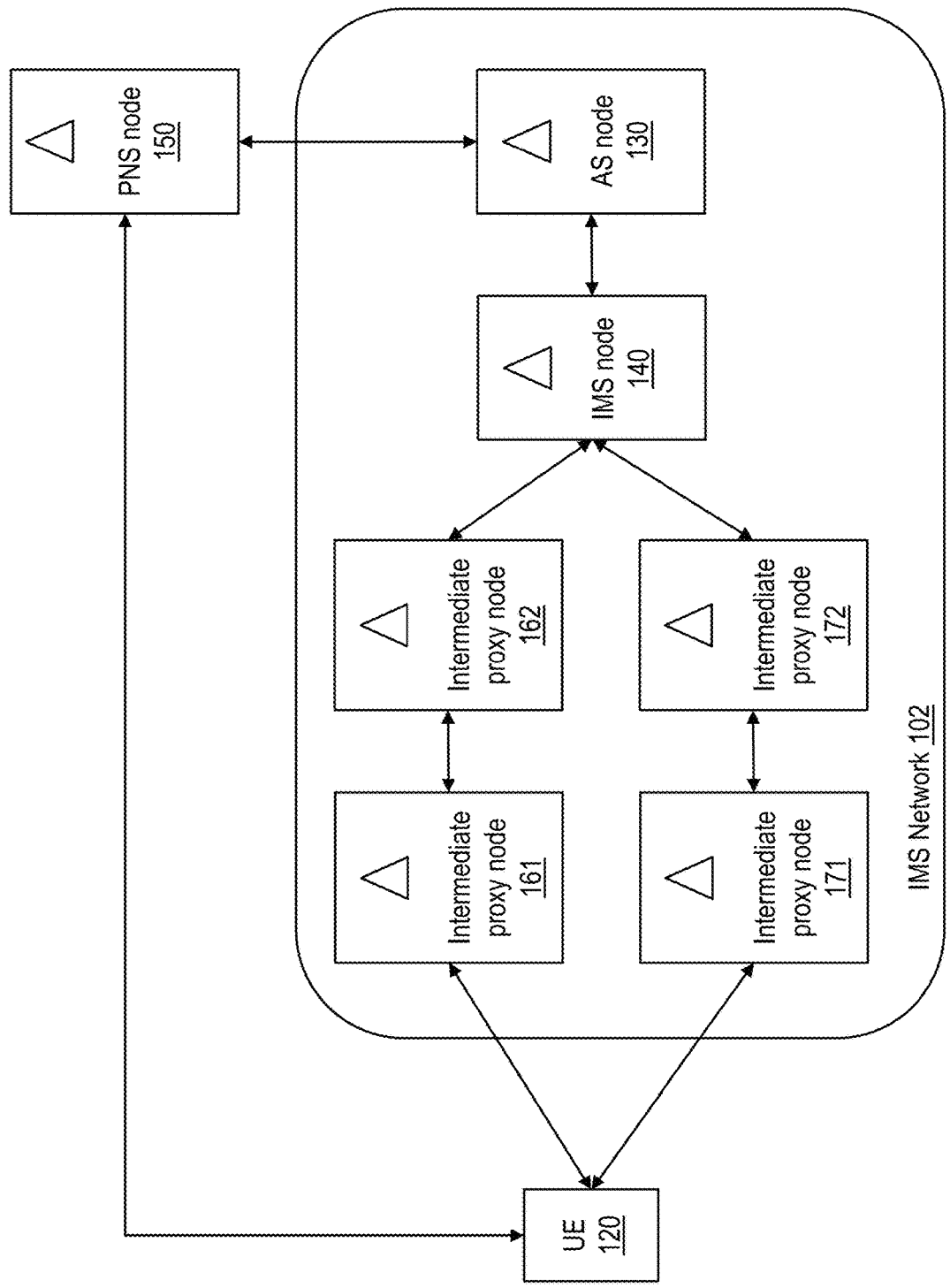
FIG. 1b is a schematic block diagram illustrating embodiments of an IMS network.

FIG. 1b shows a schematic overview of the IMS network 102 according to an example scenario wherein embodiments herein may be applied. The IMS network 102 comprises one or more IMS nodes, such the IMS node 140 and may comprise the AS node 130 described above. The IMS network 102 further comprises the intermediate proxy nodes 161, 162, 171, 172. The AS node 130 may communicate with UE through any one or more of the intermediate proxy nodes 161, 162, 171, 172, and with the IMS node 140 and the PNS node 150. SIP signaling between the UE 120 and e.g. an AS pass through the intermediate proxy nodes 161, 162, and possibly another SIP-proxy, and the IMS node 140. If the one of the intermediate proxy nodes 161, 162 fails or becomes unavailable, the registration to the IMS network have to be performed again using different available intermediate proxy nodes, such as e.g. intermediate proxy nodes 171, 172 in order to restore the association.

A number of embodiments will now be described, some of which may be seen as alternatives, while some may be used in combination.

Figure 2:
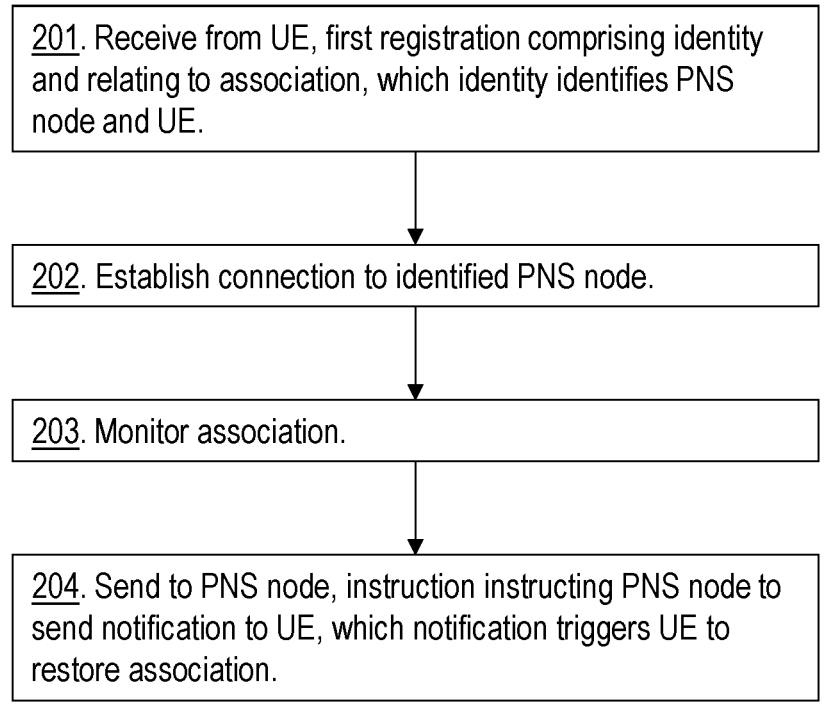
FIG. 2 is a flowchart depicting embodiments of a method in an AS node.

Example embodiments of a method performed by the AS node 130 for assisting the UE 120 in restoring an association between the IMS node 140, and the UE 120 via one or more first intermediate proxy nodes 161, 162 in the communications network 100, will now be described with reference to a flowchart depicted in FIG. 2. An association between the IMS node 140 and the UE 120 via one or more first intermediate proxy nodes 161, 162 when used herein may mean a signaling path between the UE 120 and the IMS node 140 comprising the first intermediate proxy nodes 161, 162. In an example scenario an association between the IMS node 140, and the UE 120 via one or more first intermediate proxy nodes 161, 162 is currently used in the communications network 100.

The method comprises the following actions, which actions may be taken in any suitable order.

Action 201

When the UE 120 initiates to use services in the IMS network 102, the UE 120 needs to perform a registration in order to establish an association with the IMS node 140.

The AS node 130 receives a first registration from the UE 120. The first registration is related to the association. The first registration may, but is not limited to, be e.g. a SIP REGISTER message. The first registration registers the UE 120 to an IMS network 102. The first registration comprises an identity identifying the UE 120 and the PNS node 150 serving the UE 120. The word first in the first registration when used herein is just used to differentiate the registration from any other registration performed by the UE 120, such as e.g. a second registration as described below. The received first registration allows, e.g. triggers, the AS node 130 to start monitoring the association in order to detect if a failure occurs. The identity may e.g. comprise a Push Resource Identity (PRID) identifying the UE 120 and a URI identifying the PNS node 150.

Before the first registration is received by the AS node 130, it will pass through the IMS node 140. The IMS node 140 may determine that the UE 120 is configured with subscription for monitoring the association. The IMS node 140 may e.g. be an S-SCSF node.

Therefore, in some embodiments, the first registration is comprised in a third party registration message sent by the IMS node 140 to the AS node 130. The message invokes monitoring of the association.

Action 202

The UE 120 needs to be notified, e.g. informed, when one or more proxy nodes 161, 162 has become unavailable. The AS node 130 will use the PNS node 150 for sending such notifications to the UE 120, and may therefore set up a connection to the PNS node 150. The PNS node 150 is found and identified by means of the identities in the first registration.

Thus, the AS node 130 may establish a connection to the identified PNS node 150. The connection is used to instruct the identified PNS node 150 to send notifications to the UE 120.

Action 203

To be able to detect when one or more of the intermediate proxy nodes 161, 162 related to the association become unavailable, the AS node 130 needs to keep track on their status. Therefore, the AS node 130 monitors said association. The monitoring may be performed by sending signaling messages to the one or more first intermediate proxy nodes 161, 162 and evaluate the responses received.

In some embodiments, the monitoring of the association comprises sending availability monitoring signaling to the one or more intermediate proxies 161, 162. The availability monitoring signaling may e.g. comprise sending SIP OPTIONS messages to the one or more first intermediate proxy nodes 161, 162. This may be used by the AS node 130 to determine if any of the one or more first intermediate proxy nodes 161, 162 has become unavailable based on lack of responses. The AS node 130 may e.g. know from message embedding in third party registration (3PTY REG) what intermediate proxy nodes are used for the association, e.g. via a Via header and/or a Path header.

Action 204

As hinted above, when one or more of the intermediate proxy nodes 161, 162 related to the association becomes unavailable, the AS node 130 will instruct the PNS node 150 to notify the UE 120 to restore the association.

When any of the intermediate proxy nodes 161, 162 in the monitored association becomes unavailable, the AS node 130 sends an instruction to the identified PNS node 150. The instruction instructs the PNS node 150 to send a notification to the identified UE 120. The notification sent by the PNS node 150 may e.g. be a push notification. The notification triggers the UE 120 to restore the association between the IMS node 140 and the UE 120 via one or more available second intermediate proxy nodes 171, 172. It should be noted that one or more of the first intermediate proxy nodes 161, 162 may not be unavailable, and may thus be reused when restoring the association via the one or available second intermediate proxy nodes 171, 172. E.g. when the first intermediate proxy node 161 becomes unavailable, it may be replaced by any of the intermediate proxy nodes 171 or 172, but the proxy node 162 when still being available may be reused as a second intermediate proxy node. Likewise, e.g. when the first intermediate proxy node 162 becomes unavailable, it may be replaced by any of the intermediate proxy nodes 171 or 172, but the proxy node 161 when still being available may be reused as a second intermediate proxy node.

The association will be restored by the UE 120 sending a second registration relating to the restored association, to re-register the UE 120 to the IMS network 102. The second registration will restore the association by the IMS node 140 receiving the second registration e.g. a second registration request. The IMS node 140 will subsequently perform registration procedures for the UE 120. The re-registration when used herein may mean just a further registration.

In this way, the UE 120 will be able to restore the association with minimal impact on energy consumption and network performance.

It is an advantage if the UE 120 knows which alternative intermediate proxy nodes, such as e.g. the one or more available second intermediate proxy nodes 171, 172, are available for restoring the association. Therefore, in some embodiments, the instruction comprises an indication indicating the one or more available second proxy nodes 171, 172.

Figure 3:
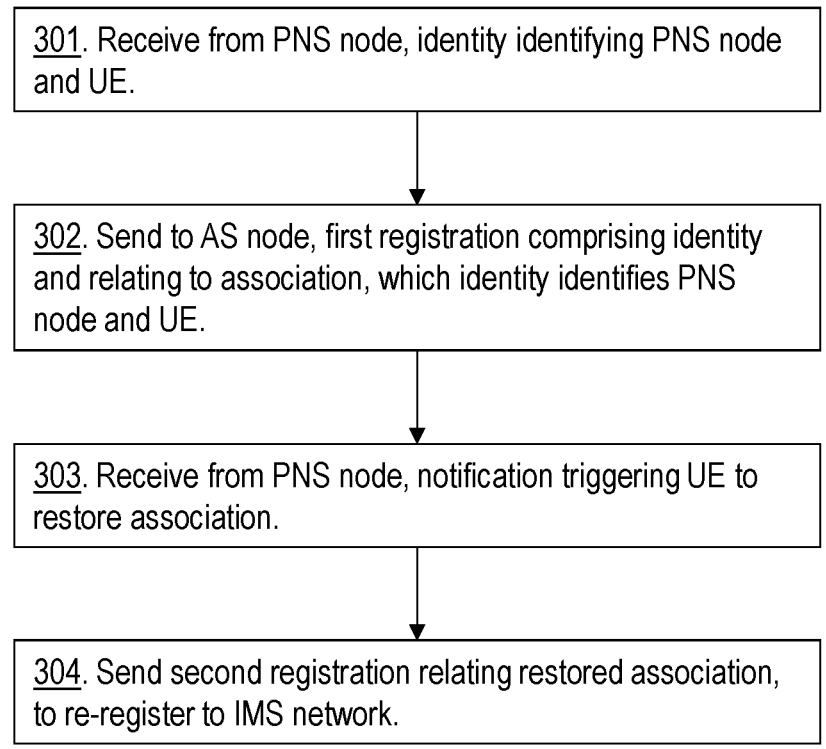
FIG. 3 is a flowchart depicting embodiments of a method in a UE.

FIG. 3 shows example embodiments of a method performed by the UE 120 for restoring an association between the IMS node 140, e.g. an S-CSCF, and the UE 120 via one or more first intermediate proxy nodes 161, 162 in the communications network 100. An association between the IMS node 140 and the UE 120 via one or more first intermediate proxy nodes 161, 162 when used herein may mean a signaling path between the UE 120 and the IMS node 140 comprising the first intermediate proxy nodes 161, 162. In an example scenario an association between the IMS node 140, and the UE 120 via one or more first intermediate proxy nodes 161, 162 is currently used in the communications network 100.

The method comprises the following actions, which actions may be taken in any suitable order.

Action 301

A service in the IMS network 102 that the UE 120 may want to use is to receive notifications, e.g. for triggering the restoration of the association between the UE 120 and the IMS node 140 as will be described below,. The notifications may e.g. be push notifications. To be able to receive notifications from the IMS network 102, the UE 120 may need an identity related to a subscription for notifications. The UE 120 may therefore send a request for subscription for notifications to the PNS node 150.

In some embodiments, the UE 120 receives the identity in response to requesting a subscription for notifications, from the PNS node 150. The identity identifies the UE 120 and the PNS node 150 serving the UE 120. The identity may e.g. comprise a Push Resource Identity (PRID) identifying the UE 120 and a URI identifying the PNS node 150.

Action 302

When the UE 120 wants to use services such as e.g. voice call sessions, e.g. Voice over IP (VoIP), video call sessions or messaging in the IMS network 102, the UE 120 needs to perform a registration in order to establish an association with the IMS node 140. The association may e.g. be a signaling path between the UE 120 and the IMS node 140 comprising the first intermediate proxy nodes 161, 162. The UE 120 may need the association with the IMS node 140 to exchange signaling messages.

The UE 120 sends a first registration relating to the association to the AS node 130 e.g. a PCRM-AS. The first registration may, but is not limited to, be e.g. a SIP REGISTER message. The first registration registers the UE 120 to an IMS network 102The first registration comprises the identity identifying the UE 120 and the PNS node 150 serving the UE 120. The identity may e.g. comprise a PRID identifying the UE 120 and a URI identifying the PNS node 150.

Action 303

When any of the intermediate proxy nodes 161, 162 in the association becomes unavailable, the UE 120 receives a notification from the identified PNS node 150. The notification triggers the UE 120 to restore the association. The notification sent by the PNS node 150 may e.g. be a push notification.

Action 304

Since one or more of the intermediate proxy nodes 161, 162 is unavailable, the association needs to be restored using alternative intermediate proxy node.

The UE 120 restores the association between the IMS node 140 and the UE 120 via one or more available second intermediate proxy nodes 171, 172. It should be noted that as mentioned above, one or more of the first intermediate proxy nodes 161, 162 may not be unavailable, and may thus be reused as a second intermediate proxy node when restoring the association via the one or available second intermediate proxy nodes 171, 172. The association is restored by sending a second registration relating to the restored association, to re-register the UE 120 to the IMS network 102. By restoring the association, the UE 120 may be able to continue to use services in the IMS network 102. As mentioned above, the association may be a signaling path between the UE 120 and the IMS node 140. The restored association may therefore also be a signaling a signaling path, but comprising instead e.g. the one or more available second intermediate proxy nodes 171, 172.

The UE 120 may preferably provide the identity in the second registration. This may in some embodiments be needed to continue to receive notifications from the IMS network 102.

Therefore, in some embodiments, the second registration comprises the identity identifying the UE 120 and the PNS node 150 serving the UE 120.

In some embodiments, when restoring the association, the UE 120 finds out which available second intermediate proxy nodes 171, 172 to use.

Therefore, in these embodiments, the one or more available second proxy nodes 171, 172 is determined from any one or more of:

An indication, comprised in the notification, indicating the one or more available second proxy nodes 171, 172. This indication may e.g. comprise a list of available intermediate proxy nodes the UE 120 may use when restoring the association.

A response to a Domain Name Service (DNS) query. This response may e.g. comprise a list of available intermediate proxy nodes the UE 120 may use when restoring the association.

A configuration in the UE 120. This configuration may e.g. comprise a list of intermediate proxy nodes the UE 120 may use when establishing or restoring the association. The UE 120 may obtain said list e.g. during registration, or the UE 120 may be preconfigured with said list.

Embodiments herein such as mentioned above will now be further described and exemplified. The text below is applicable to and may be combined with any suitable embodiment described above.

Figure 4:
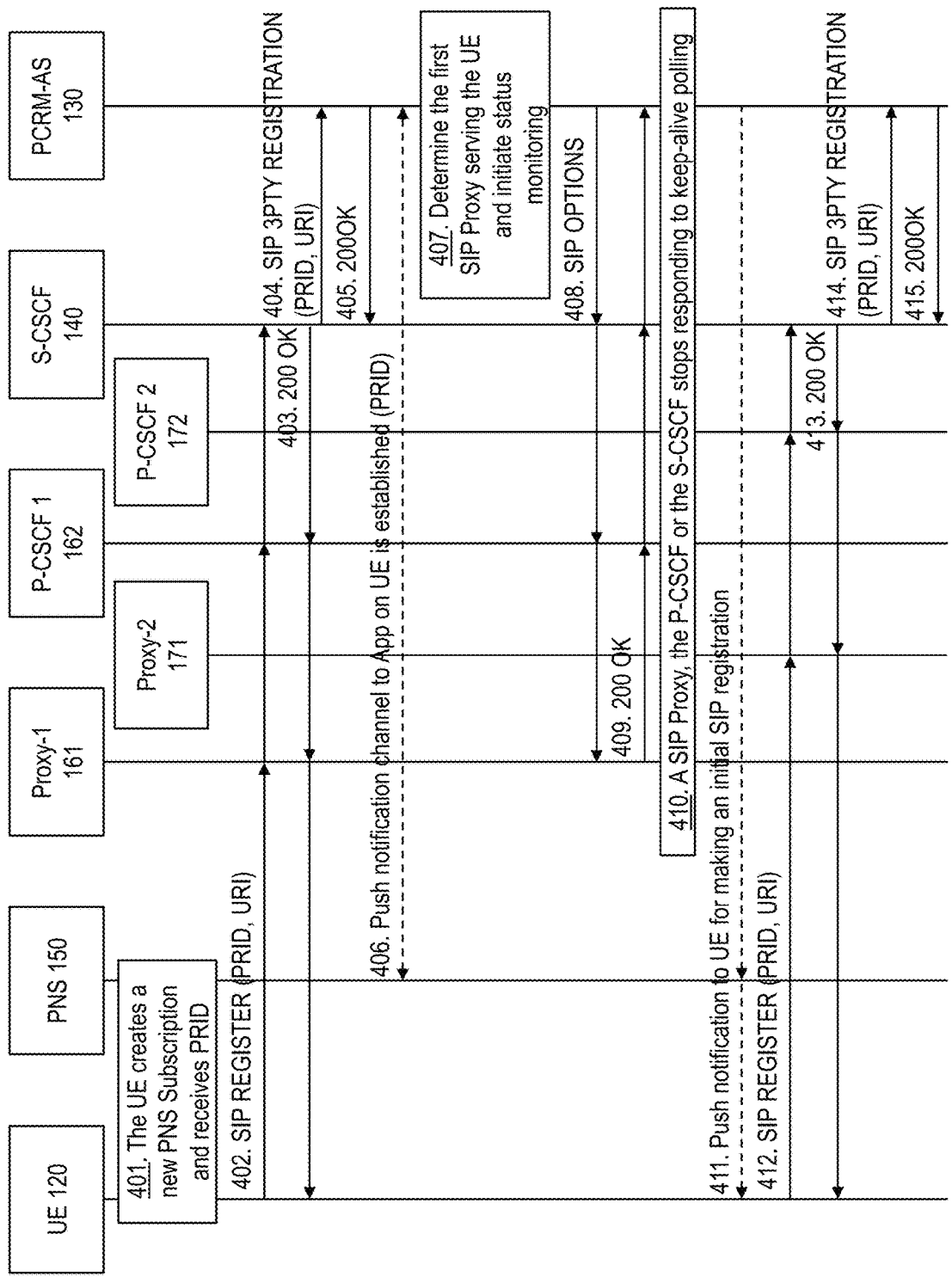
FIG. 4 is a sequence diagram depicting embodiments of a method.

Actions 401-415 of FIG. 4 depict detailed steps for an implementation example according to embodiments herein. In the FIG. 4 the AS node 130 is referred to as PCRM-AS 130, the UE 120 is referred to as UE 120 the IMS node 140 is referred to as S-CSCF 140, the PNS node 150 is referred to as PNS 150 and the respective one or more first and second intermediate proxy nodes 161, 162, 171, 172 are referred to as Proxy-1 161, P-CSCF 1 162, Proxy-2 171 and P-CSCF 2 172. The action may be taken in any suitable order.

Action 401

Prior to performing a SIP registration to the IMS network 102, the UE 120 initiates a subscription to the PNS 150, which may be the PNS node 150. In response to initiating the subscription, the UE 120 receives a unique identity, such as e.g. a Push Resource ID (PRID) from the PNS 150. The unique identity is a value associated with the registration that can be used to generate push notifications. This relates to Action 301 described above.

Action 402

When an application that uses IMS services is executed on the UE 120, the UE 120 performs an initial SIP registration by sending e.g. a SIP REGISTER request to the nearest SIP proxy, such as e.g. Proxy-1 161, which may e.g. be any one of the one or more first intermediate proxy nodes 161, 162. The UE 120 adds one or more identities such as the PRID and a URI for the PNS 150 to the SIP registration request. The initial SIP registration may e.g. be the first registration mentioned above.

The Proxy-1 161 relays the request to the P-CSCF 1 162, which may be any one of the one or more first intermediate proxy nodes 161, 162, it is proxy for. Possibly but not depicted, via other SIP proxies in front of the P-CSCF 1 162.

The P-CSCF 1 162 registers the UE 120 and relays the request to the S-CSCF 140, which may be the IMS node 140. This relates to Actions 201 and 302 described above.

Action 403

The S-CSCF 140 registers the UE 120. The UE 120 may be authenticated (not shown) and the successful registration is acknowledged back to the P-CSCF 1 162 with a 200 OK message. The P-CSCF 1 162 forwards the 200 OK to Proxy-1 161, possibly via other SIP proxies, and the Proxy-1 161 forwards the 200 OK to the UE 120. The UE 120 is now registered for IMS services in the IMS network 102.

Action 404

The UE's 120 subscription has an initial filter criteria (iFC) to invoke the PCRM-AS 130, which may be the AS node 130, with a third-party registration from the S-CSCF 140. The third party registration message includes the message body from the incoming SIP registration request from the UE 120, and thus also the PRID. This relates to Actions 201 and 302 described above.

Action 405

The PCRM-AS 130 sends an acknowledgement back to the S-CSCF 140 with a 200 OK message.

Action 406

The PCRM-AS 130 establishes a connection to the PNS 150. The URI for the PNS 150 is determined from the SIP registration request received in the third party registration. This relates to Action 202 described above.

Action 407

From the SIP registration request in the third party registration, the PCRM-AS 130 determines the IP address of the first SIP proxy, Proxy-1 161.

Action 408

If not already ongoing, the PCRM-AS 130 initiates status monitoring of the Proxy-1 161 by sending e.g. a SIP OPTIONS message to the Proxy-1 161, via the S-CSCF 140, the P-CSCF 1 162 and possibly, but not depicted, other SIP proxies in front of the P-CSCF 1 162. The status monitoring will implicitly monitor all SIP Proxies between PCRM-AS 130 and the UE 120. This relates to Action 203 described above.

Action 409

The Proxy-1 161 acknowledges by sending a 200 OK message back to the PCRM-AS 130 via the P-CSCF 1 162, the S-CSCF 140 and possibly, but not depicted, other SIP proxies in front of the P-CSCF 1 162.

Action 410

If the PCRM-AS 130 does not receive responses to the status monitoring, it is an indication that either the Proxy-1 161, some intermediate SIP proxy, the P-CSCF 1 162 or the S-CSCF 140 serving the UE 120 has become unavailable. When either of these network nodes fails, the association between the UE 120 and S-CSCF 140 needs to be restored. This relates to Action 204 described above.

Action 411

The PCRM-AS 130 sends an instruction to the PNS 150 instructing the PNS 150 to send a notification to the UE 120. The notification triggers the UE 120 to restore the association to the S-CSCF 140 by performing a SIP registration via a second proxy, Proxy-2 171, which may e.g. be any one of the one or more second intermediate proxy nodes 171, 172. This relates to Actions 204 and 303 described above.

Action 412

The UE 120 performs a SIP registration by sending e.g. a SIP REGISTER request to the second proxy, Proxy-2 171. The SIP registration may e.g. be the second registration as mentioned above. The UE 120 adds the PRID and URI for the PNS 150 to the SIP registration request. The Proxy-2 171 relays the request to the P-CSCF 2 172, which may be any one of the one or more intermediate proxy nodes 171, 172, it is proxy for, possibly but not depicted, via other SIP proxies in front of the P-CSCF 2 172.

The P-CSCF 2 172 registers the UE 120 and relays the request to the S-CSCF 140. This relates to Action 304 described above.

Action 413

The S-CSCF 140 registers the UE 120. The UE may be authenticated (not shown) and the successful registration is acknowledged back to the P-CSCF 2 172 with a 200 OK message. The P-CSCF 2 172 forwards the 200 OK to the Proxy-2 171, possibly via other SIP proxies, and the Proxy-2 171 forwards the 200 OK to the UE 120, which now is registered for IMS services in the IMS network 102.

Action 414

As mentioned above, the subscription of the UE 120 has an iFC to invoke the PCRM-AS, with a third-party registration from the S-CSCF 140. The third party registration message includes the message body from the incoming SIP registration request from the UE 120, and thus also the PRID.

Action 415

The PCRM-AS 130 acknowledge back to the S-CSCF 140 with a 200 OK message and starts to monitor the status of the now restored association.

Figure 5A:
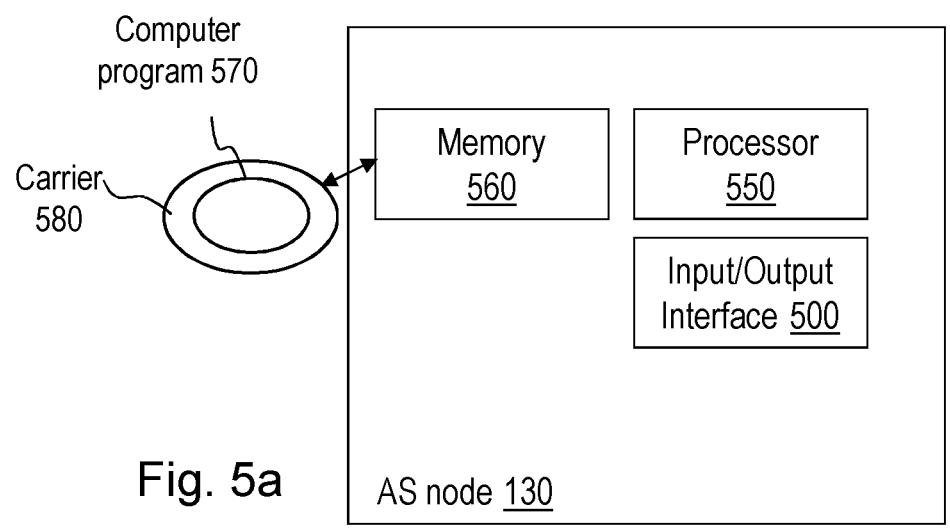
FIGS. 5a-b are schematic block diagrams illustrating embodiments of an AS node.
Figure 5B:
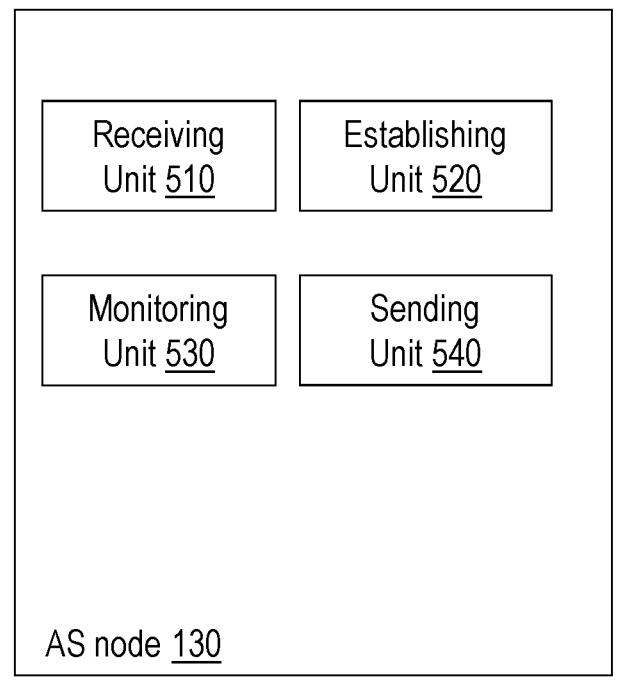

To perform the method actions above, the AS node 130 may comprise an arrangement depicted in FIGS. 5a and b. The AS node 130 is configured to assist the UE 120 in restoring an association between the IMS node 140 and the UE 120 via one or more first intermediate proxy nodes 161, 162 in a communications network 100

The AS 120 may comprise an input and output interface 500 configured to communicate with network nodes such as the IMS node 130, the PNS node 150 and the UE 120. The input and output interface 500 may comprise a wireless receiver (not shown) and a wireless transmitter (not shown).

The AS node 130 is further configured to, e.g. by means of a receiving unit 510 in the AS node 130, receive from the UE 120 a first registration relating to the association. The first registration is adapted to register the UE 120 to an IMS network 102. The first registration is further adapted to comprise an identity adapted to identify the UE 120 and a PNS, node 150 serving the UE 120.

The first registration may be adapted to be comprised in a third party registration message sent by the IMS node 140. The message is adapted to invoke monitoring of the association.

The AS node 130 may further be configured to, e.g. by means of an establishing unit 520 in the AS node 130, establish a connection to the identified PNS node 150. The connection is adapted to be used to instruct the identified PNS node 150 to send notifications to the UE 120.

The AS node 130 is further configured to, e.g. by means of a monitoring unit 530 in the AS node 130, monitor said association.

The AS node 130 is further configured to, e.g. by means of a sending unit 540 in the AS node 130, send an instruction to the identified PNS node 150 when any of the intermediate proxy nodes 161, 162 in the monitored association becomes unavailable. The instruction is adapted to instruct the PNS node 150 to send a notification to the identified UE 120. The notification is adapted to trigger the UE 120 to restore the association between the IMS node 140 and the UE 120. The association is restored via one or more available second intermediate proxy nodes 171, 172 by sending a second registration relating to the restored association, to re-register the UE 120 to the IMS network 102.

The instruction may comprises an indication indicating the one or more available second proxy nodes 171, 172.

The AS node 130 may further be configured to monitor the association by further e.g. by means of the sending unit 540 in the AS node 130, send availability monitoring signaling to the one or more intermediate proxies 161, 162.

The embodiments herein may be implemented through a respective processor or one or more processors, such as the processor 550 of a processing circuitry in the AS node 130 depicted in FIG. 5a, together with respective computer program code for performing the functions and actions of the embodiments herein. The program code mentioned above may also be provided as a computer program product, for instance in the form of a data carrier carrying computer program code for performing the embodiments herein when being loaded into the AS node 130. One such carrier may be in the form of a CD ROM disc. It is however feasible with other data carriers such as a memory stick. The computer program code may furthermore be provided as pure program code on a server and downloaded to the AS node 130.

The UE 120 may further comprise a memory 560 comprising one or more memory units. The memory 560 comprises instructions executable by the processor 550 in AS node 130. The memory 560 is arranged to be used to store e.g. identities, registrations, instructions and associations and applications to perform the methods herein when being executed in the AS node 130.

In some embodiments, a computer program 570 comprises instructions, which when executed by the respective at least one processor 550, cause the at least one processor 550 of the AS node 130 to perform the actions above.

In some embodiments, a respective carrier 580 comprises the respective computer program 570, wherein the carrier 580 is one of an electronic signal, an optical signal, an electromagnetic signal, a magnetic signal, an electric signal, a radio signal, a microwave signal, or a computer-readable storage medium.

Those skilled in the art will appreciate that the units in the AS node 130 described above may refer to a combination of analog and digital circuits, and/or one or more processors configured with software and/or firmware, e.g. stored in the AS node 130, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 6A:
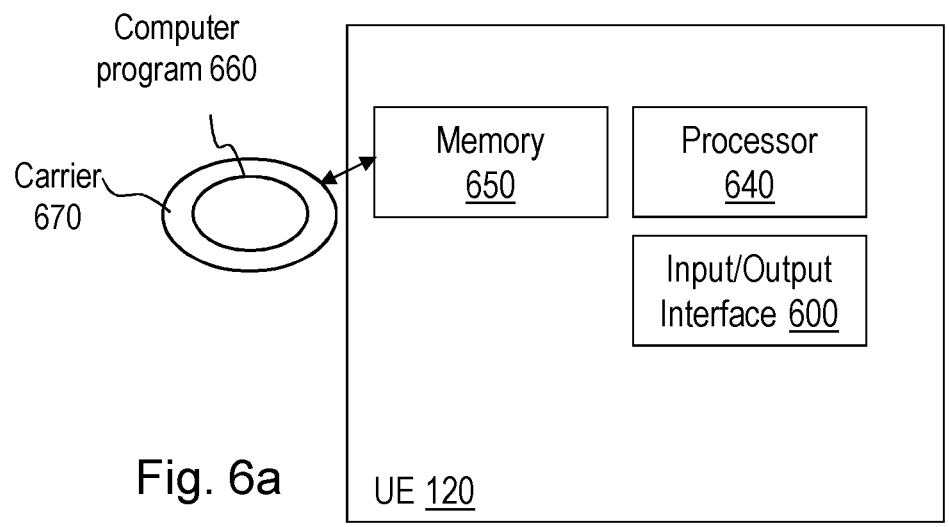
FIGS. 6a-b are schematic block diagrams illustrating embodiments of an UE.
Figure 6B:
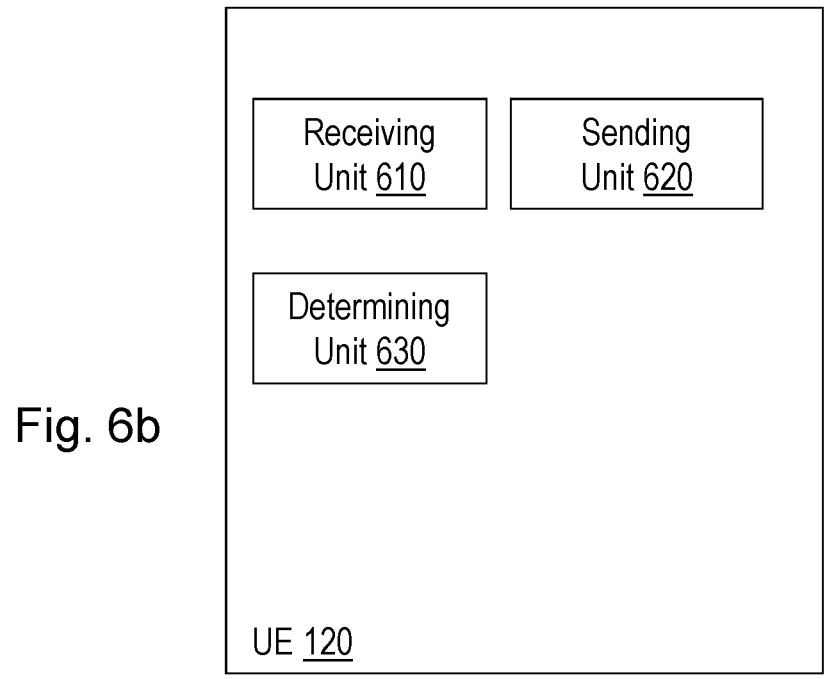

To perform the method actions above, the UE 120 may comprise an arrangement depicted in FIGS. 6a and b. The UE 120 is configured restore an association between the IMS node 140 and the UE 120 via one or more first intermediate proxy nodes 161, 162 in a communications network 100.

The UE 120 may comprise an input and output interface 600 configured to communicate with network nodes such as the AS node 130, the IMS node 130 and the PNS node 150.

The input and output interface 500 may comprise a wireless receiver not shown and a wireless transmitter not shown.

The UE 120 is further configured to, e.g. by means of a receiving unit 610 in the UE 120, when any of the intermediate proxy nodes 161, 162 in the association becomes unavailable, receive a notification from the identified PNS node 150, triggering the UE (120) to restore the association.

The UE 120 may further be configured to, e.g. by means of the receiving unit 610 in the UE 120, receive from the PNS node 150, the identity in response to requesting a subscription for notifications. The identity may be adapted to identify the UE 120 and the PNS node 150 serving the UE 120.

The AS node 130 is further configured to, e.g. by means of a sending unit 620 in the UE 120, send to the AS node 130, a first registration relating to the association. The first registration is adapted to comprise the identity adapted to identify the UE 120 and the PNS node 150 serving the UE 120.

The UE 120 is further configured to restore the association between the IMS node 140 and the UE 120 via one or more available second intermediate proxy nodes 171, 172 by, e.g. by means of the sending unit 620 in the UE 120, send a second registration relating to the restored association, to re-register the UE 120 to the IMS network 102.

The second registration may be adapted to comprise the identity identifying the UE 120 and the PNS node 150 serving the UE 120.

The UE 120 may further be configured to, e.g. by means of a determining unit 630 in the UE 120, determine wherein the one or more available second proxy nodes 171, 172 from any one or more of: An indication, comprised in the notification, indicating the one or more available second proxy nodes 171, 172, a response to a DNS query, and a configuration in the UE 120.

The embodiments herein may be implemented through a respective processor or one or more processors, such as the processor 640 of a processing circuitry in the AS node 130 depicted in FIG. 5a, together with respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise a memory 650 comprising one or more memory units. The memory 650 comprises instructions executable by the processor 640 in UE 120. The memory 650 is arranged to be used to store e.g. identities, registrations, notifications, associations and applications to perform the methods herein when being executed in the UE 120.

In some embodiments, a computer program 660 comprises instructions, which when executed by the respective at least one processor 640, cause the at least one processor 640 of the UE 120 to perform the actions above.

In some embodiments, a respective carrier 670 comprises the respective computer program 660, wherein the carrier 670 is one of an electronic signal, an optical signal, an electromagnetic signal, a magnetic signal, an electric signal, a radio signal, a microwave signal, or a computer-readable storage medium.

Those skilled in the art will appreciate that the units in the UE 120 described above may refer to a combination of analog and digital circuits, and/or one or more processors configured with software and/or firmware, e.g. stored in the UE 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 7:
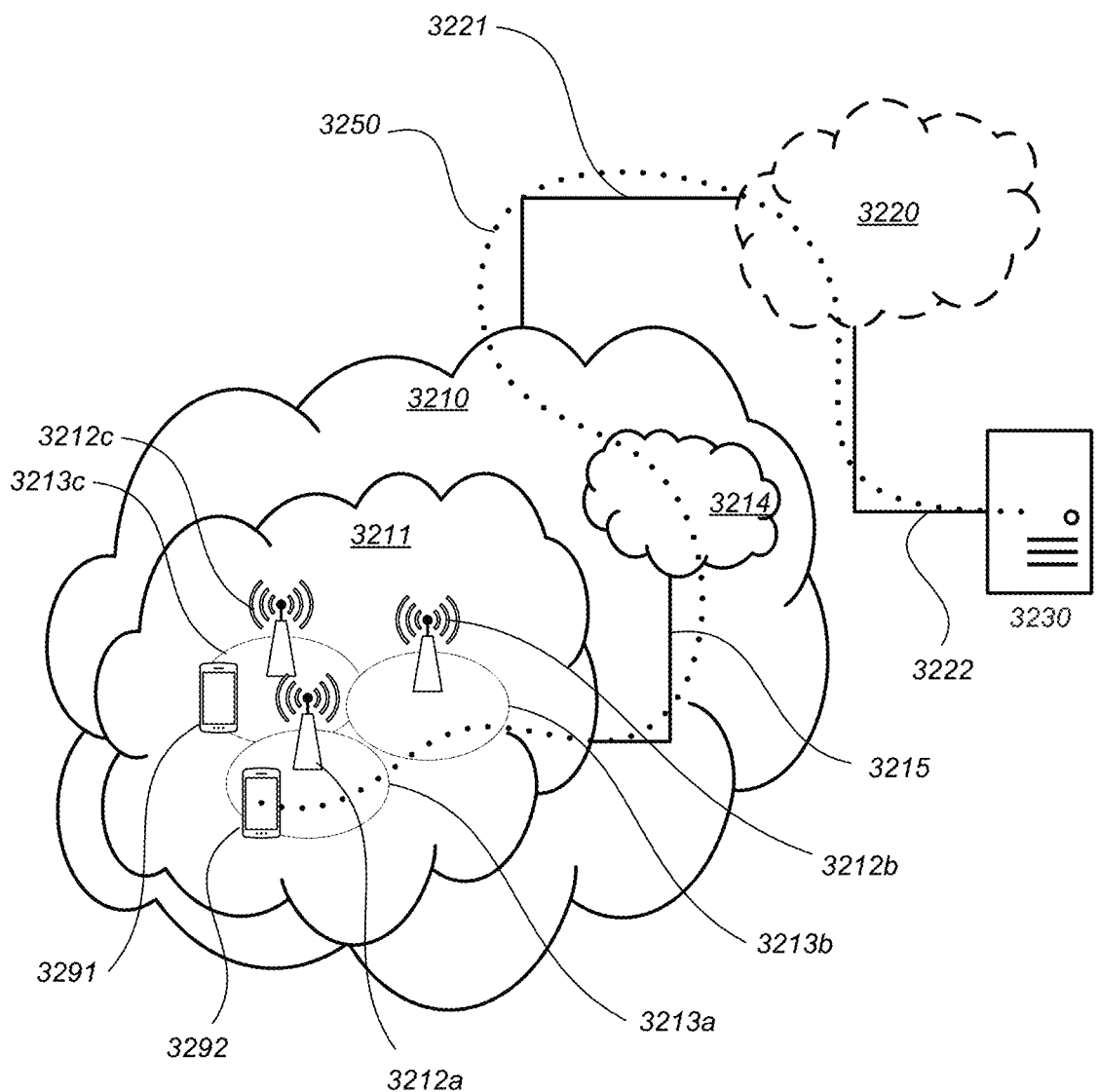
FIG. 7 schematically illustrates a telecommunication network connected via an intermediate network to a host computer.

With reference to FIG. 7, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 8 may be identical to the host computer 3230, one of the base stations 3212*a*, 3212*b*, 3212*c* and one of the UEs 3291, 3292 of FIG. 7, respectively. This is to say, the inner workings of these entities may be as shown in FIG. 8 and independently, the surrounding network topology may be that of FIG. 7.

Figure 8:
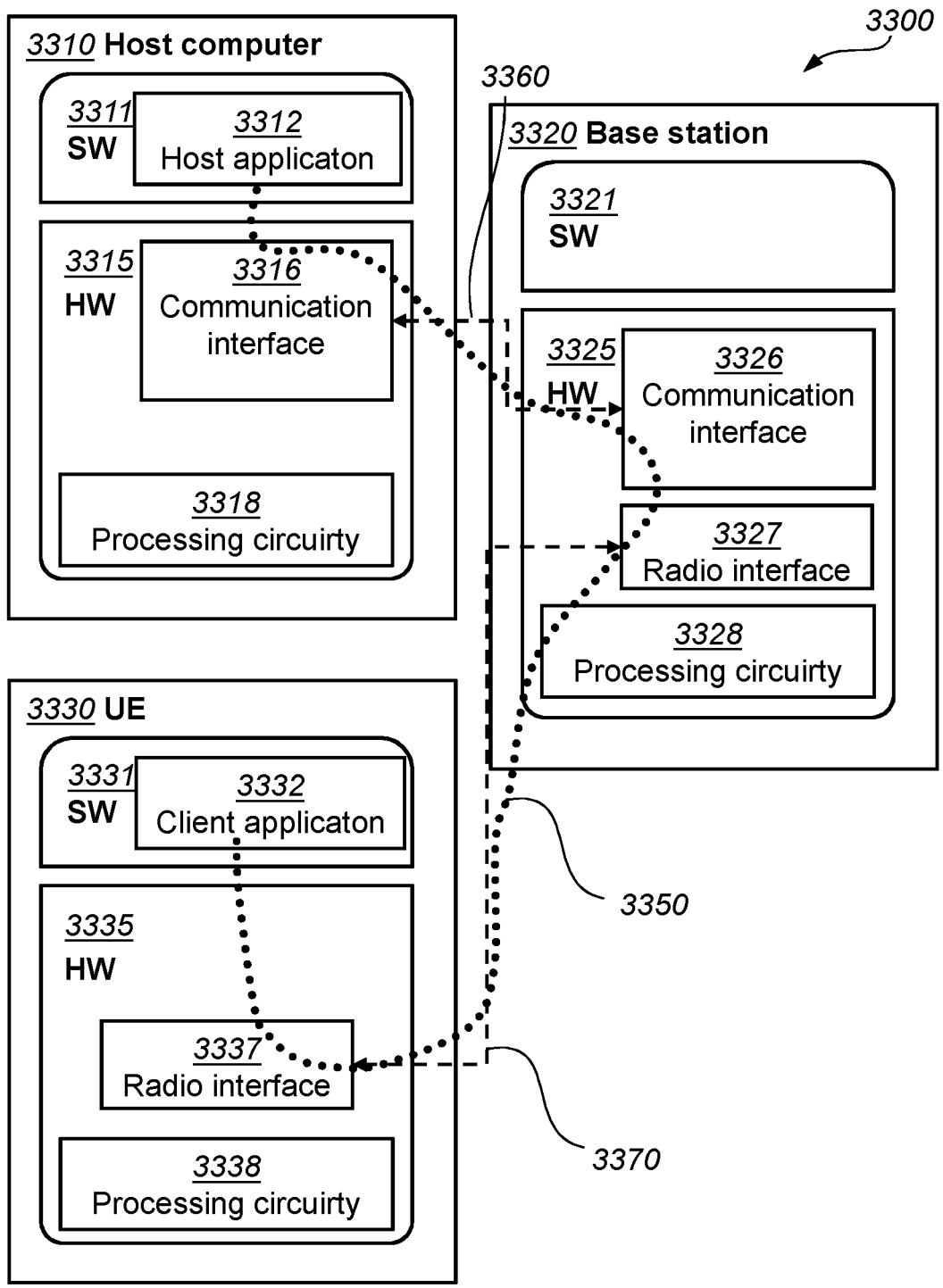
FIG. 8 is a generalized block diagram of a host computer communicating via a base station with a user equipment over a partially wireless connection.

In FIG. 8, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the [select the applicable RAN effect: data rate, latency, power consumption] and thereby provide benefits such as [select the applicable corresponding effect on the OTT service: reduced user waiting time, relaxed restriction on file size, better responsiveness, extended battery lifetime].

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 9 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 9 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 10 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 10 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 11 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 11 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 12 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by an Application Server, AS, node for assisting a User Equipment, UE, in restoring an association between an Internet protocol Multimedia Subsystem, IMS, node, and the UE via one or more first intermediate proxy nodes in a communications network, the method comprising:

when receiving from the UE, a first registration relating to the association, monitoring said association, wherein the first registration registers the UE to an IMS network, and wherein the first registration comprises an identity identifying the UE and an identity identifying a Push Notification Service, PNS, node serving the UE, and when any of the first intermediate proxy nodes in the monitored association becomes unavailable, sending an instruction to the identified PNS node, which instruction instructs the PNS node to send a notification to the identified UE, which notification triggers the UE to:
restore the association between the IMS node and the UE via one or more available second intermediate proxy nodes by sending a second registration relating to the restored association, to re-register the UE to the IMS network.

2. The method according to claim 1, further comprising: establishing a connection to the identified PNS node, which connection is used to instruct the identified PNS node to send notifications to the UE.

3. The method according to claim 1, wherein the monitoring of the association comprises sending availability monitoring signaling to the one or more intermediate proxies.

4. The method according to claim 1, wherein the first registration is comprised in a third party registration message sent by the IMS node, which message invokes monitoring of the association.

5. The method according to claim 1, wherein the instruction comprises an indication indicating the one or more available second proxy nodes.

6. A method performed by a User Equipment, UE, for restoring an association between an Internet protocol Multimedia Subsystem, IMS, node and the UE via one or more first intermediate proxy nodes in a communications network, the method comprising:

sending to an Application Server, AS, node, a first registration relating to the association, wherein the first registration registers the UE to an IMS network, and wherein the first registration comprises an identity identifying the UE and an identity identifying a Push Notification Service, PNS, node serving the UE, and when any of the first intermediate proxy nodes in the association becomes unavailable, receiving a notification from the identified PNS node, triggering the UE to:
  restoring the association between the IMS node and the UE via one or more available second intermediate proxy nodes by sending a second registration relating to the restored association, to re-register the UE to the IMS network.

7. The method according to claim 6, further comprising:
in response to requesting a subscription for notifications, receiving from the PNS node, the identity identifying the UE and the identity identifying the PNS node serving the UE.

8. An Application Server, AS, node configured to assist a User Equipment, UE, in restoring an association between an Internet protocol Multimedia Subsystem, IMS, node, and the UE via one or more first intermediate proxy nodes in a communications network, wherein the AS node comprises:
  at least one processor;
  a non-transitory computer readable medium comprising computer executable instructions;
  wherein, in response to executing the computer executable instructions, the at least one processor is configured to:
  when receiving from the UE a first registration relating to the association, monitor said association, wherein the first registration is adapted to register the UE to an IMS network, and wherein the first registration further is adapted to comprise an identity adapted to identify the UE and an identity identifying a Push Notification Service, PNS, node serving the UE, and
  when any of the first intermediate proxy nodes in the monitored association becomes unavailable, send an instruction to the identified PNS node, which instruction is adapted to instruct the PNS node to send a notification to the identified UE, which notification is adapted to trigger the UE to:
    restore the association between the IMS node and the UE via one or more available second intermediate proxy nodes by sending a second registration relating to the restored association, to re-register the UE to the IMS network.

9. The AS node according to claim 8, wherein the at least one processor is further being configured to:
  establish a connection to the identified PNS node, which connection is adapted to be used to instruct the identified PNS node to send notifications to the UE.

10. The AS node according to claim 8, wherein the at least one processor is further being configured to monitor the association by further sending availability monitoring signaling to the one or more intermediate proxies.

11. The AS node according to claim 8, wherein the first registration is adapted to be comprised in a third party registration message sent by the IMS node, which message is adapted to invoke monitoring of the association.

12. The AS node according to claim 8, wherein the instruction comprises an indication indicating the one or more available second proxy nodes.

13. A User Equipment, UE, configured to restore an association between an Internet protocol Multimedia Subsystem, IMS, node and the UE via one or more first intermediate proxy nodes in a communications network, wherein the UE comprises:
  at least one processor;
  a non-transitory computer readable medium comprising computer executable instructions;
  wherein, in response to executing the computer executable instructions, the at least one processor is configured to:
  send to an Application Server, AS, node, a first registration relating to the association, wherein the first registration is adapted to register the UE to an IMS network, and wherein the first registration further is adapted to comprise an identity adapted to identify the UE and an identity identifying a Push Notification Service, PNS, node serving the UE, and
  when any of the first intermediate proxy nodes in the association becomes unavailable, receive a notification from the identified PNS node, triggering the UE to:
    restore the association between the IMS node and the UE via one or more available second intermediate proxy nodes by sending a second registration relating to the restored association, to re-register the UE to the IMS network.

14. The UE according to claim 13, wherein the at least one processor is further being configured to:
  in response to requesting a subscription for notifications, receive from the PNS node, the identity adapted to identify the UE and the identity identifying the PNS node serving the UE.

15. The UE according to claim 13, wherein the second registration is adapted to comprise the identity identifying the UE and the identity identifying the PNS node serving the UE.

16. The UE according to claim 13, wherein the one or more available second proxy nodes is determined from any one or more of:
  an indication, comprised in the notification, indicating the one or more available second proxy nodes,
  a response to a Domain Name Service (DNS) query, and
  a configuration in the UE.

\* \* \* \* \*